Patented Dec. 10, 1929

1,738,998

UNITED STATES PATENT OFFICE

JINKICHI INOUYE, OF SENDAI, MIYAGI-KEN, JAPAN

PROCESS OF MANUFACTURING ACID-PROOF AND WATERPROOF BLACK INK

No Drawing.   Application filed June 9, 1925. Serial No. 36,020.

This invention relates to manufacture of black ink, and the object thereof is to obtain an ink which resists water and acid.

Writing ink now generally in use is a mixture handed down from several hundred years ago and consists of a solution of ferrous tannate mixed with a coloring matter. Several materials are added thereto to increase its consistency, and its decomposition is prevented by mixing an acid therewith. But such a mixture is not ideal as ink, because a ferrous salt acting as a catalyzer of oxidation, changes the nature of the ingredients from time to time while being used, and produces precipitates. At the same time the acidity increasing, even a metallic pen will be corroded. Moreover, on account of the changes of the nature of the ingredients, its blacking capacity decreases and the ink becomes unfit for use.

To remove these drawbacks, and manufacture ideal ink, the inventor thought it necessary to simplify the ingredients and to select such a compound which gives a colloidal solution. After a long experiment, he has found that ammonium salt of tetra- or hexa- nitro-sulphonic acid of di-naphthylene-dioxide, is suited for this purpose. The starting material, di-naphthylene-dioxide is obtained by heating in an autoclave a mixture of $\beta$-naphthol and cupric oxide or manganese peroxide, according to the following reaction.

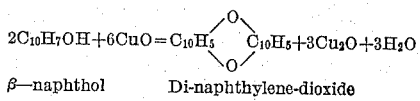

$\beta$—naphthol    Di-naphthylene-dioxide

The hexa-nitro-derivative, if it is treated simply with ammonia water or an ammoniacal solution of sulphonated compound of the reaction product of ammonia and the above hexa-nitro-derivative, will also produce a colloidal solution which is suitable to be used as ink.

Solutions of the above derivatives in the form of ammonium salt are all of colloidal nature, and characters written with such ink, if dried, are absolutely fast to water and acid, having great resisting property against bleaching agents and moreover acquires an alkali-fast property by a certain treatment.

As this ink is made of a simple ingredient, it rarely changes its nature while being used, and can be used to the last drop. Moreover as it is neutral, it never corrodes the pen, and as it is not intermingled with any other material, there is no fear of dregs collecting on the pen.

Also as the ink gives a colloidal solution it produces precipitate if an acid is added thereto, such precipitate may be filtered, washed with water and dried to be formed into solid ink-element which can be dissolved in ammonia water to get a liquid ink. In its solid form it is very convenient for transportation of a large quantity.

The following are a few examples of manufacturing my ink.

Example I

Add to 1 part of di-naphthylene-dioxide 6 parts of a strong nitric acid (specific gravity 1.38) and 3 parts of water, and heat the mixture to 100° for 25 hours. Then tetra-nitro-derivative is obtained in the shape of red crystals. Wash the crystals with water and dry them. Take 1 part of the dried crystals and dissolve them in 30 parts of a strong sulphuric acid (specific gravity 1.8), and heat the solution to 170 or 180° C. and is kept at that temperature for 3–4 hours, and the color is changed into dark violet. If the liquid is left to cool and thrown into water, black precipitate falls down, which when filtered, washed with water, and dissolved in a dilute solution of ammonia, colloidal ink of purple black color is obtained.

Example II

Add to 1 part of di-naphthylene-dioxide 15 parts of a strong nitric acid (specific gravity 1.38) and heat the mixture for about 50 hours at a temperature of 110° C., and then hexa-nitro-derivative is obtained in a shape of rhombic plate of orange color. This is washed with water and dried, and 1 part of it is heated for 2 or 3 hours after adding thereto 30 parts of a strong sulphuric acid (specific gravity 1.8) to 220–230° C. The color is then changed into dark violet. When the liquid after cooling is thrown into water, black precipitate falls down. This precipitate is filtered and washed with water, and is dissolved in a suitable quantity of dilute ammonia water, and a colloidal ink of purple black color is obtained.

Example III

Add to 1 part of di-naphthylene-dioxide 10 parts of a strong nitric acid (specific gravity 1.38) and shaking the fluid for half an hour, add thereto 2 parts of a strong sulphuric acid. Then heat the liquid to 105 to 110° C. for four hours, and a hexa-nitro-derivative will be obtained in the shape of thin rhombic crystals of orange color. This is washed with water and dried, and is treated as in Example II, and a colloidal ink of purple black color is obtained.

Example IV

Add to 1 part of di-naphthylene dioxide 10 parts of a strong nitric acid and 2 parts of water, and after shaking the liquid for 2 hours, heat it to 105–110° C. for four hours; and hexa-nitro derivative will be obtained in a form of needle crystals of orange color. This is washed with water and dried, and to 1 part of it, is added 30 parts of a strong sulphuric acid. The mixture is then heated to 160° C. for two hours, and then a black colored solution is obtained. This is left to cool and throw into water, and a black precipitate falls down. The precipitate is filtered and if it is dissolved in a suitable quantity of a dilute ammonia water, a colloidal ink of pure black color will be obtained.

Example V

To 1 part of rhombic flakes of hexa-nitro derivative of di-naphthylene-dioxide add about 20 parts of ammonia water (specific gravity, 0.956), and if the mixture is heated, it will gradually dissolve and become a fluid of dark purple color. Distil the liquid and remove excess of ammonia, and acidulate the remaining liquid. Then a black precipitate will fall down. The precipitate is dissolved in a suitable amount of water, and a colloidal ink of purple black color will be obtained.

Example VI

Evaporate and dry the ink solution obtained as in Example V, or wash and dry the precipitate formed by adding an acid to such ink, and to 1 part of it add 10 parts of a strong sulphuric acid. Heat the mixture to 90° C. for 2 hours, and a solution of dark violet color will be obtained. Cool the solution, throw it in water, separate the precipitate by filtration, and by dissolving the same in a suitable amount of ammonia water, an ink of dark purple color will be obtained.

Example VII

Separate by filtration the black precipitate obtained in Examples I–VI, and wash and dry it, and the various kinds of ink in solid form will be obtained in solid form (ink element). These are all easily soluble in ammonia water, and thus a writing ink can be obtained.

From the foregoing it will be observed that the process comprises two essential steps, namely, the treatment of a solution of tetra- or hexa-nitro-derivative in sulphuric acid so as to produce from said solution a precipitate, and the dissolution of said precipitate in ammonia to produce a colloidal ink.

Claims—

1. The process of manufacturing ink, which consists in dissolving a tetra-nitro-derivative of di-naphthylene-di-oxide in sulphuric acid, treating the solution to produce a precipitate therefrom, and dissolving said precipitate in ammonia.

2. The process of manufacturing ink, which consists in adding nitric acid to di-naphthylene-di-oxide and heating the mixture to produce a tetra-nitro-derivative in the form of crystals, dissolving said crystals in sulphuric acid, treating the solution to produce a precipitate, and dissolving said precipitate in ammonia.

3. The process herein described, which consists in forming a tetra-nitro-sulphonic acid of di-naphthylene-di-oxide, treating said product to produce a precipitate, and dissolving said precipitate in ammonia.

4. The process herein described, which consists in treating di-naphthylene-di-oxide to produce a tetra-nitro-derivative, dissolving said derivative in sulphuric acid, treating the solution to produce a precipitate therefrom, and dissolving said precipitate in ammonia.

In testimony whereof I have affixed my signature.

JINKICHI INOUYE.